United States Patent
Iwasaki

(10) Patent No.: US 7,460,279 B2
(45) Date of Patent: Dec. 2, 2008

(54) ADJUSTMENT METHOD, IMAGE READING DEVICE, AND IMAGE FORMING APPARATUS FOR ADJUSTING READ SENSORS

(75) Inventor: Takeshi Iwasaki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 498 days.

(21) Appl. No.: 11/219,914

(22) Filed: Sep. 7, 2005

(65) Prior Publication Data

US 2006/0050951 A1 Mar. 9, 2006

(30) Foreign Application Priority Data

| Sep. 8, 2004 | (JP) | ............................. 2004-260414 |
| Sep. 8, 2004 | (JP) | ............................. 2004-260415 |
| Jul. 7, 2005 | (JP) | ............................. 2005-198207 |
| Jul. 19, 2005 | (JP) | ............................. 2005-207941 |

(51) Int. Cl.
- H04N 1/387 (2006.01)
- H04N 1/40 (2006.01)
- H04N 1/04 (2006.01)

(52) U.S. Cl. .................. 358/450; 358/471; 358/474
(58) Field of Classification Search .................. 358/450
See application file for complete search history.

(56) References Cited

U.S. PATENT DOCUMENTS

| 4,149,091 | A | * | 4/1979 | Crean et al. .................. 250/566 |
| 4,691,114 | A | * | 9/1987 | Hasegawa et al. ............ 358/474 |
| 4,742,240 | A | * | 5/1988 | Yamanishi et al. ........... 358/300 |
| 4,833,724 | A | * | 5/1989 | Goel ........................... 382/318 |
| 4,899,226 | A | * | 2/1990 | Tanimoto et al. ............. 358/451 |
| 5,144,448 | A | * | 9/1992 | Hornbaker et al. ........... 348/324 |
| 6,195,471 | B1 | * | 2/2001 | Larsen ........................ 382/284 |
| 6,348,981 | B1 | * | 2/2002 | Walsh ......................... 358/474 |
| 7,271,837 | B2 | * | 9/2007 | Karasawa .................... 348/324 |
| 2005/0111064 | A1 | | 5/2005 | Iwasaki |

FOREIGN PATENT DOCUMENTS

| JP | 59-105762 | 6/1984 |
| JP | 8-97980 | 4/1996 |
| JP | 2000-86020 | 3/2000 |

* cited by examiner

Primary Examiner—Twyler L. Haskins
Assistant Examiner—Fred Guillermety
(74) Attorney, Agent, or Firm—Oblon, Spivak, McClelland, Maier & Neustadt, P.C.

(57) ABSTRACT

The adjustment method is disclosed in that a predetermined reference interval in a main scanning direction is compared with each interval in the main scanning direction obtained by reading a sheet so that each joint of image is located between two parallel lines, a start pixel and an end pixel to read image data at each joint are determined and adjusted by calculating each interval difference, a reference straight line extending along the main scanning direction is compared with each of the plurality of straight line images extending along the main scanning direction at joints of images, and a delay time for reading sensors is adjusted by calculating an average value of relative displacement amounts.

9 Claims, 13 Drawing Sheets

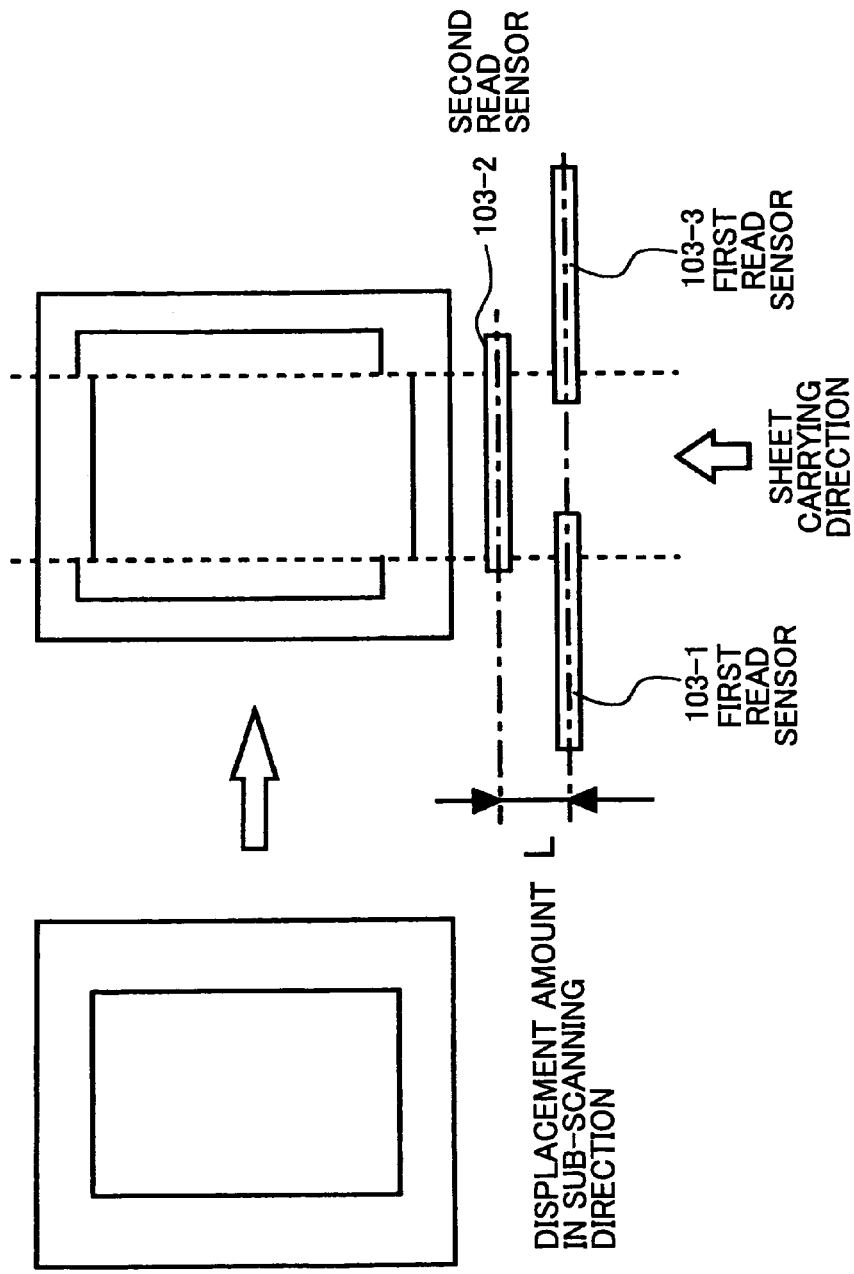

SLN>SL

DISPLACEMENT AMOUNT IN SUB-SCANNING DIRECTION BETWEEN FIRST READ SENSOR 103-1 AND SECOND READ SENSOR 103-2

$$R12 = \sum_{n=1}^{n} \{Y1(n) - Y2L(n)\}/n$$

DISPLACEMENT AMOUNT IN SUB-SCANNING DIRECTION BETWEEN FIRST SENSOR 103-3 AND SECOND SENSOR 103-2

$$R32 = \sum_{n=1}^{n} \{Y3(n) - Y2R(n)\}/n$$

DISPLACEMENT AMOUNT: Y1(n)-Y2L(n)

ADJUSTMENT METHOD, IMAGE READING DEVICE, AND IMAGE FORMING APPARATUS FOR ADJUSTING READ SENSORS

BACKGROUND OF THE INVENTION

1. Field of the Invention

The present invention generally relates to an image forming apparatus such as a copier, a facsimile, a printer, and a like for forming an image by using an electronic photograph method and an inkjet method, and more particularly to an adjustment method for adjusting a plurality of reading parts, an image reading device for adjusting a plurality of reading parts, and an image forming apparatus for adjusting a plurality of reading parts, in which higher image quality of an image can be realized in that no image displacement caused by duplicated pixels and dropped pixels occurs.

2. Description of the Related Art

In the following, one of technologies concerning an image reading device will be described with reference to FIG. 1 through FIG. 3. FIG. 1 is a schematic diagram showing a configuration of the image reading device. The image reading device 10a recognizes that a sheet 11 is inserted into the image reading device 10a, when a first paper detector 9 detects an edge of the sheet 11 inserted on the sheet table 8. Then, the image reading device 10a causes a first carriage roller 1 and a second carriage roller 2 to rotate, and determines a start timing to read the sheet by using a second paper detector 10. When the sheet 11 is lead by the first carriage roller being rotated to a read sensor 3, the sheet 11 is read by the read sensor 3. When a reading process for the sheet is completed, the sheet 11 is ejected outside the image reading device 10a by the second carriage roller 2.

A lighting unit 5 is provided inside the read sensor 3. Light having a predetermined light quantity is illuminated with respect to an image surface of the sheet 11, Reflected light, which is reflected from the image surface and corresponds to an image pattern, is focused on a photodetector 7 to form an image at an actual magnification through a SELFOC lens. An analog output level of the photodetector 7, which corresponds to an image of the sheet 11, is converted into a digital value from an analog by an A/D conversion circuit, and conversion data are accumulated in a memory as image data.

FIG. 2A is a diagram for explaining a first type of the read sensor. FIG. 2B is a diagram for explaining a second type of the read sensor. FIG. 2C is a diagram for explaining a third type of the read sensor. Reading methods are broadly classified into three types. In a first type of the read sensor shown in FIG. 2A, the sheet 11 is read out by using a read sensor 3-a, of which a shape is a single bar corresponding to a maximum width of the sheet 11. In a second type of the read sensor shown in FIG. 2B, a plurality of segmented sensors 3-b are arranged in a width direction of the sheet 11, and images read by the plurality of segmented sensors 3-b are combined (for example, see Japanese Laid-open Patent Application No. 59-105762). In a third type of the read sensor shown in FIG. 2C, the reading method is similar to the second type of the read sensor in FIG. 2B in that the sheet 11 is read by a plurality of segmented sensors 3-c. However, in the third type, a reduction lens 12 is used for each read sensor 3-c being a reduced type.

In the first type, an image having a high quality can be obtained by a simple configuration. However, the single read sensor 3-a is required to read the sheet 11 at any size of the sheet 11 in the width direction. A cost of a component of the read sensor 3-a is proportional to a length of the sheet 11 in the width direction. For example, in a case of reading the sheet 11 having an A0 width, a sensor having an A0 length is needed, and the cost of the component of the read sensor 3-a is increased. As a result, a cost of the image reading device 10a is increased. This is a problem of the first type.

The second type improves the first type. In the second type, the plurality of read sensors 3-b having a shorter width than the width of the single read sensor 3-a are arranged, so as to reduce the cost of the component of the read sensors 3-b. However, the second type is required to combine images read by the plurality of read sensors 3-b in order to form a composite image. As a result, an image data process becomes complicate more than the image data process in the first type.

In the third type, the cost of the components of the read sensors 3-c can be reduced more than the cost of the single read sensor 3-a, similar to the second type. In order to further reduce the cost more than the second type, the read sensors 3-c being the reduced type are used.

In an image reading method in the second type in detail, two of the read sensors 3-b are arranged at an upstream side in a sheet carrying direction, and read out two respective parts of images of the sheet 11 along a width direction of sheet 11. Subsequently, one of the read sensors 3-b is arranged at a downstream side in the sheet carrying direction, and reads out a respective part of the image along the width direction of sheet 11, which is not read out by two of the read sensors 3-b arranged at the upstream. In this case, image data, which are read out by the read sensor 3-b arranged at the upstream, are temporarily stored in a predetermined memory to cause a delay, and are combined with image data read by the read sensor 3-b arranged at the downstream.

As described above, in the second type, partial images read by the plurality of the read sensors 3-b are required to be combined. In order to normally join the partial images by combining the partial images with each other, it is required to ensure a location accuracy of the read sensors 3-b, and to precisely define a start pixel and an end pixel to read out the image in a main scanning direction of the read sensors 3-b arranged at the upstream and the downstream, simultaneously. Moreover, a relative distance between the read sensors 3-b at the upstream and the downstream is calculated in a sub-scanning direction. The image data read by the read sensor 3-b at the upstream are delayed by the relative distance. A correction operation is required to combine the image data read by the read sensors 3-b at the downstream with the image data read by the read sensor 3-b at the upstream on a single line.

FIG. 3A, FIG. 3B, and FIG. 3C are diagrams showing a case in that an image displacement is caused by a setting displacement between the start pixel and the end pixel to read out the image at a read joint of the read sensors 3-b. In FIG. 3A through FIG. 3C, a distance K is an interval between intersection points in the main scanning direction of a diamond-shaped image.

FIG. 3B is a diagram showing the image displacement in a case of setting the end pixel of a first read sensor at the upstream side to be a pixel N when a pixel 1' is defined as the start pixel of a second read sensor at the downstream. In a case of adding two pixels (+2 pixels) to a proper end pixel N−2 of the first read sensor at the upstream side in order to set the end pixel of the first read sensor at the upstream side at a pixel N, the number of pixels for an intersection interval in the main scanning direction of the diamond-shaped image partially overlapping joints becomes K+2 pixels. Since the diamond-shaped image partially overlaps two pixels, the diamond-shaped image is extended in the main scanning direction. As a result, the diamond-shaped image is displaced in the sheet carrying direction at the joints.

FIG. 3C is a diagram showing the image displacement in a case of setting the end pixel of the second read sensor at the downstream side to be a pixel N−4 when the pixel 1' is defined as the end pixel of the first read sensor at the upstream. In a case of deducting two pixels (−2 pixels) from the proper end pixel N−2 of the first read sensor at the upstream side in order to set the end pixel of the first read sensor at a pixel N−4, the number of pixels for an intersection interval in the main scanning direction of the diamond-shaped image partially overlapping joints becomes K−2 pixels. Since two pixels are dropped in the diamond-shaped image, the diamond-shaped image is reduced in the main scanning direction. As a result, the diamond-shaped image is displaced in the sheet carrying direction at the joints.

There are other methods for operating correction to compose image data with each other in which the start pixel and the end pixel in the main scanning direction to read the sheet 11 are set, as follows:

(1) method in which each relative distance in the main scanning direction and the sub-scanning direction at joints of the read sensors arranged at the upstream and the downstream is mechanically measured, each relative distance is converted into a correction value, the start pixel and the end pixel to read image data in the main scanning direction are set, and a delay amount in the sub-scanning direction of the image data read by the read sensor at the upstream is set.

(2) method in which a monitor is connected to an image reading device being the second type in order to display a read image, for example, as shown in FIG. 3A, FIG. 3B, and FIG. 3C, the diamond-shaped image and one straight line orthogonal to the sub-scanning direction are read and displayed at the monitor, the start pixel and the end pixel to read the image data in the main scanning direction are set while displaying a displacement state at each joint of the read sensors arranged at the upstream and the downstream of a displayed image, each relative displacement in the sub-scanning direction is measured and converted into the correction value, and the delay amount is set for the image data read by the read sensor arranged at the upstream.

(3) method in which one straight line orthogonal to the sub-scanning direction is read by each of the read sensors, each regression line is automatically obtained by a control circuit configured by a CPU and a like based on pixel data of a line image, a relative displacement amount in the sub-scanning direction is obtained at each joint of the read sensors, and the delay amount of the image data is set (for example, see Japanese Laid-open Patent Application No. 8-97980).

However, the methods described in the above items (1) and (2) take time and workload to measure the displacement amount at the joints of the read sensors arranged at the upstream and the downstream, and increase a production cost. Moreover, deviation of measurement results by various operators occurs, and a precise setting cannot be conducted. As a result, as shown in FIG. 3A through FIG. 3C, an image displacement is caused to the read image, and the read image becomes different from an original image.

In the method described in the above item (3), since the CPU and the like automatically measure one straight line in the sub-scanning direction and set the correction value, problems in the methods described in the above item (1) and (2) are reduced. In this method, there is no problem when a distance between the read sensors at the upstream and the downstream is a slight distance. However, in general, a width of each reading sensor in the sub-scanning direction is required to be sufficient for a width of a substrate mounting and operating a photodetector and a width of a chassis. In a case in that a staggered arrangement is conducted to the read sensors, a distance between the read sensors arranged at the upstream and the downstream becomes larger. When a displacement of a sheet carrying speed occurs and cannot be ignored during the distance, an image is read at a relatively different speed from an expected sheet carrying speed. On the other hand, the delay amount is defined based on this image. As a result, the image displacement usually occurs to most of a composite image.

SUMMARY OF THE INVENTION

It is a general object of the present invention to provide adjustment methods, image reading devices, and image forming apparatuses for adjusting read sensors, in which the above-mentioned problems are eliminated.

A more specific object of the present invention is to provide an adjustment methods, an image reading device, and an image forming apparatuses for adjusting read sensors, in which a displacement amount of an image can be easily measured at each joint of the plurality of reading sensors within a shorter time so as to suppress various discretions of operators with respect to a measurement result, the start pixel and the end pixel to read image data in the main scanning direction can be precisely determined and adjusted, and relative displacement amount of line images orthogonal to the sub-scanning direction can be precisely obtained, so as to properly combine partial images read by the plurality of reading sensors.

The above objects of the present invention are achieved by an adjustment method conducted in an image reading device including a first carrying part carrying a sheet inserted from a sheet inlet to a reading part; a plurality of reading parts including one or more first reading parts arranged along one line at a upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts; and a combining part delaying image data read by the one or more first reading parts of the plurality of reading parts arranged to be staggered, and combining image data read by the one or more first reading parts and the one or more second reading parts; and a second carrying part carrying the sheet, which ends to be read, toward a direction opposite to the sheet inlet, the adjustment method including: determining a reference interval between two parallel lines in a main scanning direction, the two parallel lines extending along a sub-scanning direction and being shown as a parallel line pattern; calculating each parallel line image interval between two parallel line images shown in each of parallel line pattern images obtained by reading the sheet so that each joint of the one or more first reading parts and the one or more second reading parts is placed between the two parallel line images; comparing the reference interval in the main scanning direction with the parallel line image interval; and determining the start pixel and the end pixel to read image data at each joint of the one or more first reading parts and the one or more second reading parts by obtaining an interval difference between the reference interval and the parallel line image interval for each joint so as to adjust the plurality of reading parts.

As described above, setting values concerning image data showing a parallel line pattern showing two parallel lines extending along the sub-scanning direction are stored in a recording unit of the image recording device beforehand. Alternatively, image data obtained by reading the sheet showing the parallel line pattern showing the two parallel lines extending along the sub-scanning direction. Either one of the image data is used to set a reference interval in the main scanning direction. The reference interval is compared with a line image interval in the main scanning direction between the two parallel line images obtained by reading the sheet so that each joint of the first read sensors and the second read sensors is placed between the two parallel straight lines. Therefore, the displacement amounts at joints the first read sensors and the second read sensors in an image can be easily measured within a shorter time. Moreover, the various discretions of operators can be suppressed with respect to the measurement result. Furthermore, the start pixel and the end pixel to read image data in the main scanning direction can be precisely determined and corrected.

The above objects of the present invention are achieved by an adjustment method conducted in an image reading device including a first carrying part carrying a sheet inserted from a sheet inlet to a reading part; a plurality of reading parts including one or more first reading parts arranged along one line at a upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts; and a combining part delaying image data read by the one or more first reading parts of the plurality of reading parts arranged to be staggered, and combining image data read by the one or more first reading parts and the one or more second reading parts; and a second carrying part carrying the sheet, which ends to be read, toward a direction opposite to the sheet inlet, the adjustment method including: determining a reference interval between two parallel lines in a main scanning direction, the two parallel lines extending along a sub-scanning direction and being shown as a parallel line pattern; calculating each parallel line image interval between two parallel line images shown in each of parallel line pattern images obtained by reading the sheet so that each joint of the one or more first reading parts and the one or more second reading parts is placed between the two parallel line images; comparing the reference interval in the main scanning direction with the parallel line image interval; determining the start pixel and the end pixel to read image data at each joint of the one or more first reading parts and the one or more second reading parts by obtaining an interval difference between the reference interval and the parallel line image interval for the each joint so as to adjust the plurality of reading parts; comparing a reference straight line extending along the main scanning direction with each of a plurality of straight line images extending along the main scanning direction at each joint of the one or more first reading parts and the one or more second reading parts, the plurality of straight line images obtained by causing the plurality of reading parts to read the sheet; obtaining an average value of relative displacement amounts by calculating displacement amounts of the plurality of straight line images in the sub-scanning direction and by calculating an arithmetic average of the displacement amounts; determining the average value of the relative displacement amounts as a delay amount of the image data read by the one or more first reading parts; and adjusting a delay time for the one or more first reading parts, the delay time used by the combining part.

As described above, setting values concerning image data showing a parallel line pattern showing two parallel lines extending along the sub-scanning direction are stored in a recording unit of the image recording device beforehand. Alternatively, image data obtained by reading the sheet showing the parallel line pattern showing the two parallel lines extending along the sub-scanning direction. Either one of the image data is used to set a reference interval in the main scanning direction. The reference interval is compared with an line image interval in the main scanning direction between the two parallel line images obtained by reading the sheet so that each joint of the first read sensors and the second read sensors is placed between the two parallel straight lines. Therefore, the displacement amounts at joints the first read sensors and the second read sensors in an image can be easily measured within a shorter time. Moreover, the various discretions of operators can be suppressed with respect to the measurement result. Furthermore, the start pixel and the end pixel to read image data in the main scanning direction can be precisely determined and corrected. In addition, relative displacement amounts of the straight line images orthogonal to the sub-scanning direction can be precisely obtained, so as to properly combine partial images to form a composite image.

The adjustment method may further includes reading the sheet in which one of the parallel line pattern including the two parallel lines extending along the sub-scanning direction by the one or more first reading parts and the one or more second reading parts is placed at a location other than joints of the one or more first reading parts and the one or more second reading parts, beforehand.

As described above, at least one reading sensor may read the two parallel lines extending along the sub-scanning direction located in a range of the reading sensor at a place other than the joints, beforehand. Image data from the reading sensor may be maintained in the recording unit of the image reading device and the reference interval between the two parallel lines may be determined based on the image data. Even if the sheet as a reference is skewed or the sheet is extended or reduced due to a temperature and relative humidity, reference interval patterns in the main scanning direction can be prevented from an error.

In the adjustment method, the start pixel and the end pixel to read the image data of the one or more first reading parts or the one or more second reading parts may be fixed at joints of the one or more first reading parts and the one or more second reading parts; by determining and correcting the start pixel and the end pixel, which are not fixed, to read the image data of the one or more first reading parts or the one or more second reading parts, the start pixel and the end pixel to read the image data by each of the plurality of reading parts may be maintained to be constant, whereby an available read range is maintained to be constant as one line connecting ranges of the plurality of reading parts.

As described above, in an available read range as one line combining read ranges of the plurality of reading parts, one range of one of the plurality of reading parts may be arbitrarily selected to fix the start pixel and the end pixel to read image data. For each of other reading parts, the start pixel and the end pixel, which are not fixed, may be determined and corrected. Each range of other reading parts can be maintained to be constant. As a result, it is possible to easily maintain the available read range as one line combining the read ranges of the plurality of reading parts in a shorter time.

In the adjustment method, when the main scanning direction may be set as an x coordinate and the sub-scanning direction is set as a y coordinate, the x coordinate of each straight line image extending along the sub-scanning direction and the y coordinate of each straight line extending along the main scanning direction may be calculated by using the centroid method.

In order to recognize a subject line to be evaluated, a "threshold search" using a pixel level and a "centroid search" using a centroid method may be used as two steps. A coordinate group recognized as straight lines is obtained by the "threshold search", and a subject straight line to be evaluated is obtained by the "centroid search". One straight line is formed by pixels of an x direction and a y direction. Since a read density difference occurs for each pixel unit, the x coordinate and the y coordinate of the straight line can be precisely obtained.

An image reading device according to the present invention applies the above the adjustment method.

An image forming apparatus according to the present invention implements an electrophotographic method or an ink-jet recording method for forming an image corresponding to an image information signal read by the above-described image reading device, and also includes the image reading device itself.

The above objects of the present invention are achieved by an adjustment method conducted in an image reading device including a first carrying part carrying a sheet inserted from a sheet inlet to a reading part; a plurality of reading parts including one or more first reading parts arranged along one line at a upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts; a combining part delaying image data read by the one or more first reading parts of the plurality of reading parts arranged to be staggered, and combining image data read by the one or more first reading parts and the one or more second reading parts; and a second carrying part carrying the sheet, which ends to be read, toward a direction opposite to the sheet inlet; an actuating part rotating and actuating the first carrying part and the second carrying part; and a control part controlling the first carrying part and the second carrying part, said adjustment method including: calculating each displacement difference of a plurality of straight line images in a sub-scanning direction at joints of the one or more first reading parts and the one or more second reading parts by reading a sheet showing a plurality of reference straight lines extending along a main scanning direction by the plurality of reading parts; obtaining an average value of the relative displacement amounts by calculating an arithmetic average of the displacement amounts; determining the average value as the delay amount of the image data read by each of the one or more first reading parts; and adjusting a delay time of the one or more first reading parts for the combining part.

As described above, by a difference between one delay amount as one average of the relative displacement amount in the sub-scanning direction at the joints of partial images read by the plurality of reading parts within the range in the sub-scanning direction from the second carrying part and the one or more first reading parts and the range being slightly distanced form the sheet edge, and another delay amount at the joints at the upstream in the sub-scanning direction, it is possible to automatically set the difference as an increase amount to the control part for controlling the first carrying part and the second carrying part to rotate and activate these parts.

BRIEF DESCRIPTION OF THE DRAWINGS

In the following, embodiments of the present invention will be described with reference to the accompanying drawings.

FIG. 5A is a diagram for explaining delay amount of image data generated between first read sensors arranged at an upstream and a second read sensor arranged at a downstream.

DESCRIPTION OF THE PREFERRED EMBODIMENTS

In the following, embodiments of the present invention will be described with reference to the accompanying drawings. The following embodiments exemplify the present invention and do not limit the present invention.

First Embodiment

Figure 4A:
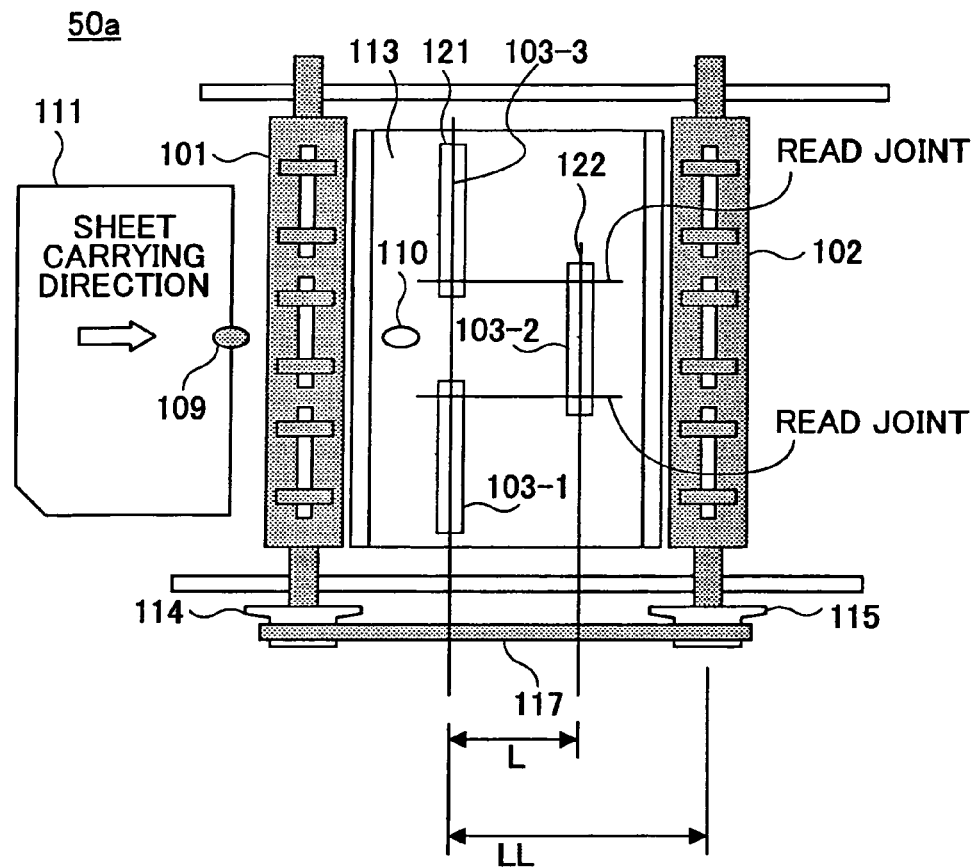
FIG. 4A is a schematic top plan view of an image reading device according to a embodiment of the present invention.
Figure 4B:
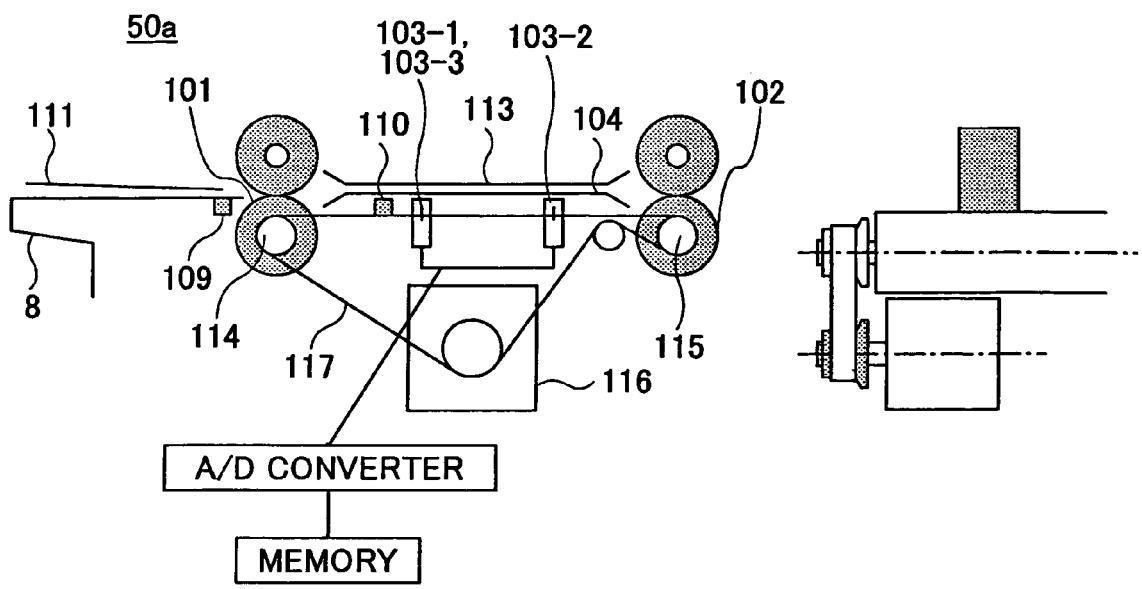
FIG. 4B is a schematic side view of the image reading device according to the embodiment of the present invention.

FIG. 4A is a schematic top plan view of an image reading device 50a according to an embodiment of the present invention, and FIG. 4B is a schematic side view of the image reading device 50a according to the embodiment of the present invention.

Referring to FIG. 4A and FIG. 4B, in the image reading device 50a, an image of a sheet 111, which is carried by first carriage rollers 101 to locate between a contact glass 104 and a pressing plate 113, is read by first read sensors 103-1 and 103-3 arranged at an upstream and a second read sensor 103-2 arranged at a downstream, and the sheet 111 is ejected by second carriage rollers 102. In FIG. 4A, a distance L is a distance in a sub-scanning direction at joints between the first read sensors 103-1 and 103-3 and the second read sensor 103-2, and the distance L corresponds to a displacement amount in the sub-scanning direction. A distance LL is a distance in the sub-scanning direction at joints between the second carriage rollers 102 and the first read sensors 103-1 and 103-3, and is distanced slightly from a sheet edge of the sheet 111.

An adjustment method of the image reading device 50a according to the present invention will be described with reference to FIG. 5A and FIG. 5B.

FIG. 5A is a diagram for explaining delay amount of image data generated between first read sensors arranged at an upstream and a second read sensor arranged at a downstream. The displacement amount L in the sub-scanning direction corresponds to the delay amount of the image data.

Figure 5B:
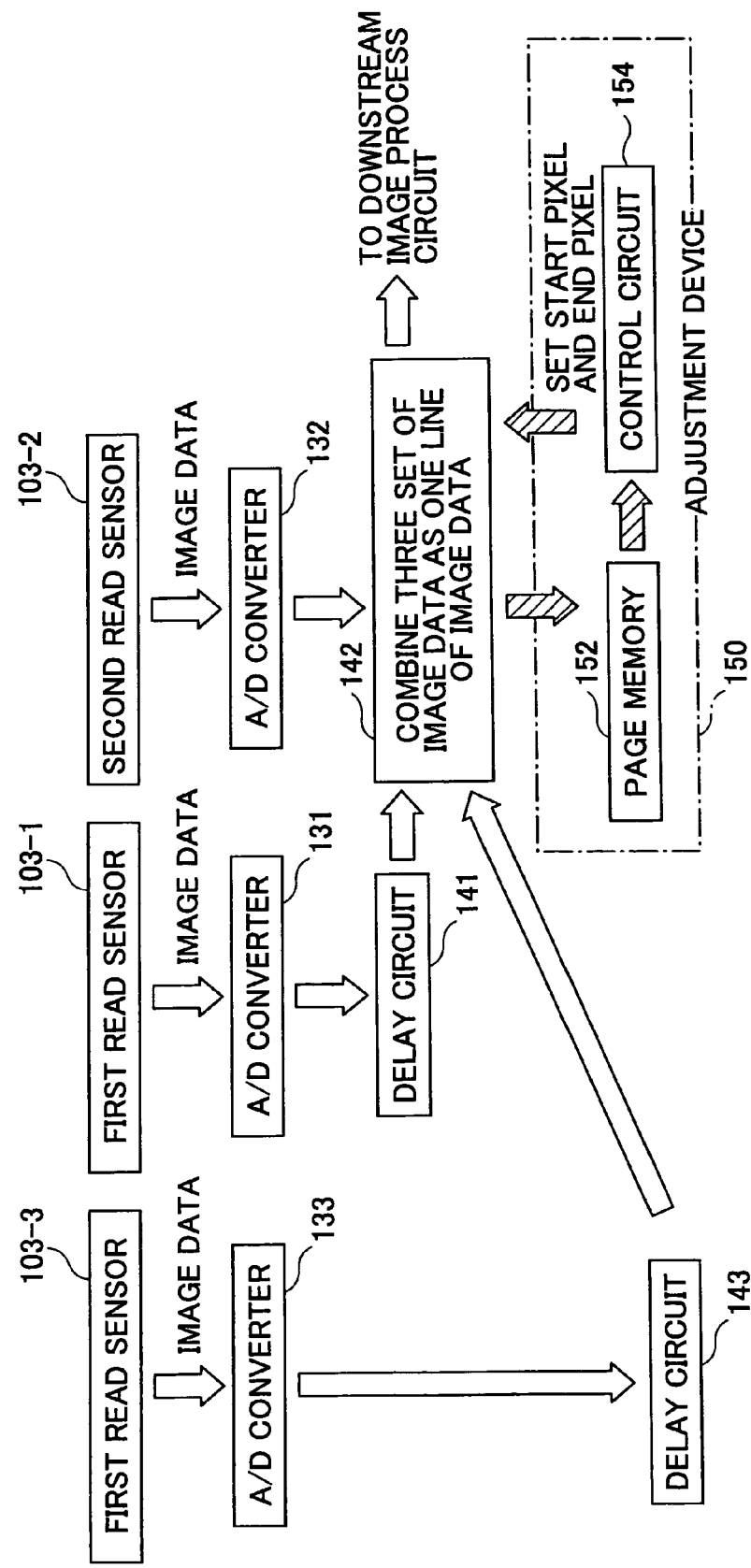
FIG. 5B is a block diagram for explaining an adjustment method of the image reading device according to the embodiment of the present invention.

FIG. 5B is a block diagram for explaining the adjustment method of the image reading device 50a according to the embodiment of the present invention. The image data read by the first read sensors 103-1 and 103-3 are converted into digital signals having 256 colors at A/D converter 131 and 133, respectively. Each of delay circuits 141 and 143 delays by lines corresponding to an average value of the relative displacement amount to which an arithmetic average is conducted by obtaining a plurality of displacement amounts L in the sub-scanning direction. Each of the digital signals is sent to a circuit 142. Image data read by the second read sensor 103-2 is converted into a digital signal by an A/D converter 132, and the digital signal showing the image data is sent to the circuit 142. By synchronizing with an output of an image read by the second read sensor 103-2, the circuit 142 combines three partial images to form one line, and sends one line to a downstream image process circuit. In this case, the number of lines (line number) to be delayed is a value obtained by dividing the displacement amount L by a read density.

In a case of combining three partial images on one line to form a composite image, the start pixel and the end pixel to read out the image data read by the first sensors 103-1 and 103-3 and the second sensor 103-2 are set to obtain three partial images from the image data. An adjustment device 150 includes a page memory 152 for maintaining each of three partial images, and a control circuit 154 for determining the start pixel and the end pixel to read out the image data read by the first read sensors 103-1 and 103-3 and the second read sensor 103-2. The adjustment device 150 is connected to the image reading device 50a.

Figure 6A:
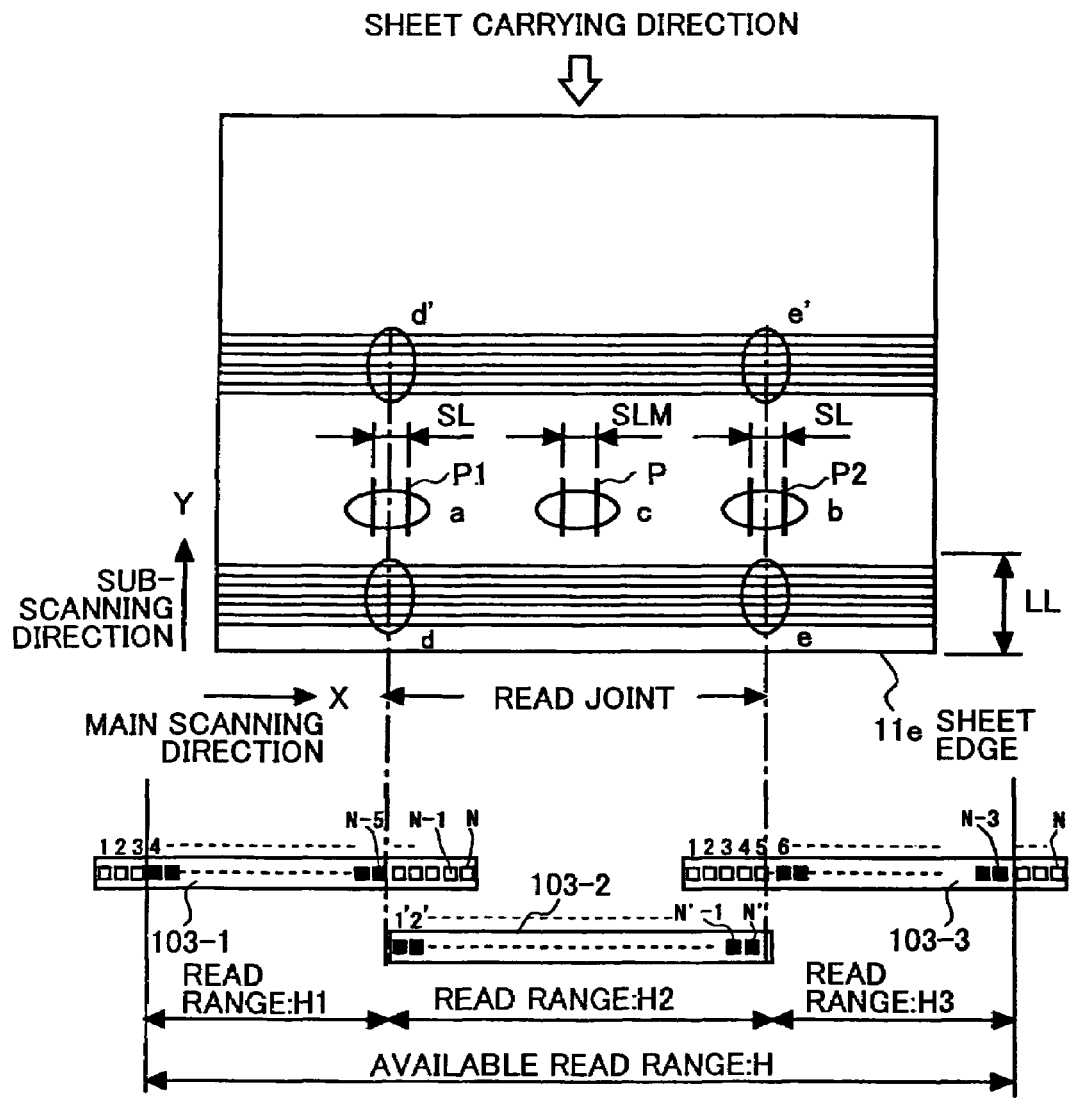
FIG. 6A is a diagram showing each layout and each read range of the read sensors according to the embodiment of the present invention.

First, the adjustment method of the image reading device 50a in the main scanning direction will be described with reference to FIG. 6A, FIG. 6B, FIG. 7A, FIG. 7B, and FIG. 7C. FIG. 6A is a diagram showing each layout and each read range of the read sensors according to the embodiment of the present invention. Each read range of the read sensors is defined from the start pixel and the end pixel to read out the image data by each of the read sensors. As shown in FIG. 6A, a read range H1 shows a read range of the read sensor 103-1, a read range H2 shows a read range of the read sensor 103-2, and a read range H3 shows a read range of the read sensor 103-3. An available read range H for the image reading device 50a can be obtained by conducting the following expression (1), so as that the available read range H becomes one range connecting all read ranges H1, H2, and H3.

$$H = H1 + H2 + H3 \quad \text{expression (1)}$$

In the embodiment, in order to simplify a control to set the start pixel and the end pixel to read out partial image data from the image data read by the read sensors 103-1 through 103-3, the start pixel 1' and the end pixel N' are fixed in the read range H2 of the second read sensor 103-2. The start pixel 4 and the end pixel N−5 of the read range H1 of the first sensor 103-1, and the start pixel 6 and the end pixel N−3 of the read range H3 of the first read sensor 103-3 are not fixed, and are adjusted.

In the following, the adjustment method of the image reading device 50a in the main scanning direction will be described in a case in that a reference sheet showing parallel line patterns, each of which includes two parallel lines in the sub-scanning direction, is read beforehand, and image data read from the reference sheet are defined as a reference interval pattern of the main scanning direction.

In detail, as shown in FIG. 6A, each of parallel line patterns P1 and P2 showing two parallel lines at a predetermined interval SL is arranged so as that each of two parallel lines is located in different adjacent read ranges (for example, one line of the parallel line pattern P1 is located in the read range H1 and another line of the parallel line pattern P1 is located in the read range H2). In addition, a parallel line pattern P having two parallel lines at an interval SLM, which is the same as the interval SL of the parallel line patterns P1 and P2, is arranged within any one of the read ranges H1, H2, and H3 (for example, arranged within the read range H2 of the read sensor 103-2) without including any joint of the read sensors 103-1, 103-2, and 103-3. The image reading device 50a reads the reference sheet. In this case shown in FIG. 6A, the start pixel 4 and the end pixel N−5 of the first read sensor 103-1 are defined in the read range H1, and the start pixel 6 and the end pixel N−3 are defined in the read range H3. In order to form a composite image, image data combined on one line are stored in the page memory 152. The control circuit 154 recognizes parallel line pattern images in regions a and b located at the joints, and a parallel line pattern image in a region c located at a place other than the joints. Accordingly, the control circuit 154 obtains the interval SLM within the region c, and defines a reference interval pattern in the main scanning direction based on the interval SLM.

Next, an interval SL' in the main scanning direction is calculated based on the parallel line pattern image recognized by the control circuit 154. In detail, a calculation will be described with reference to FIG. 7A, FIG. 7B, and FIG. 7C.

Figures 7A, 7B, 7C:
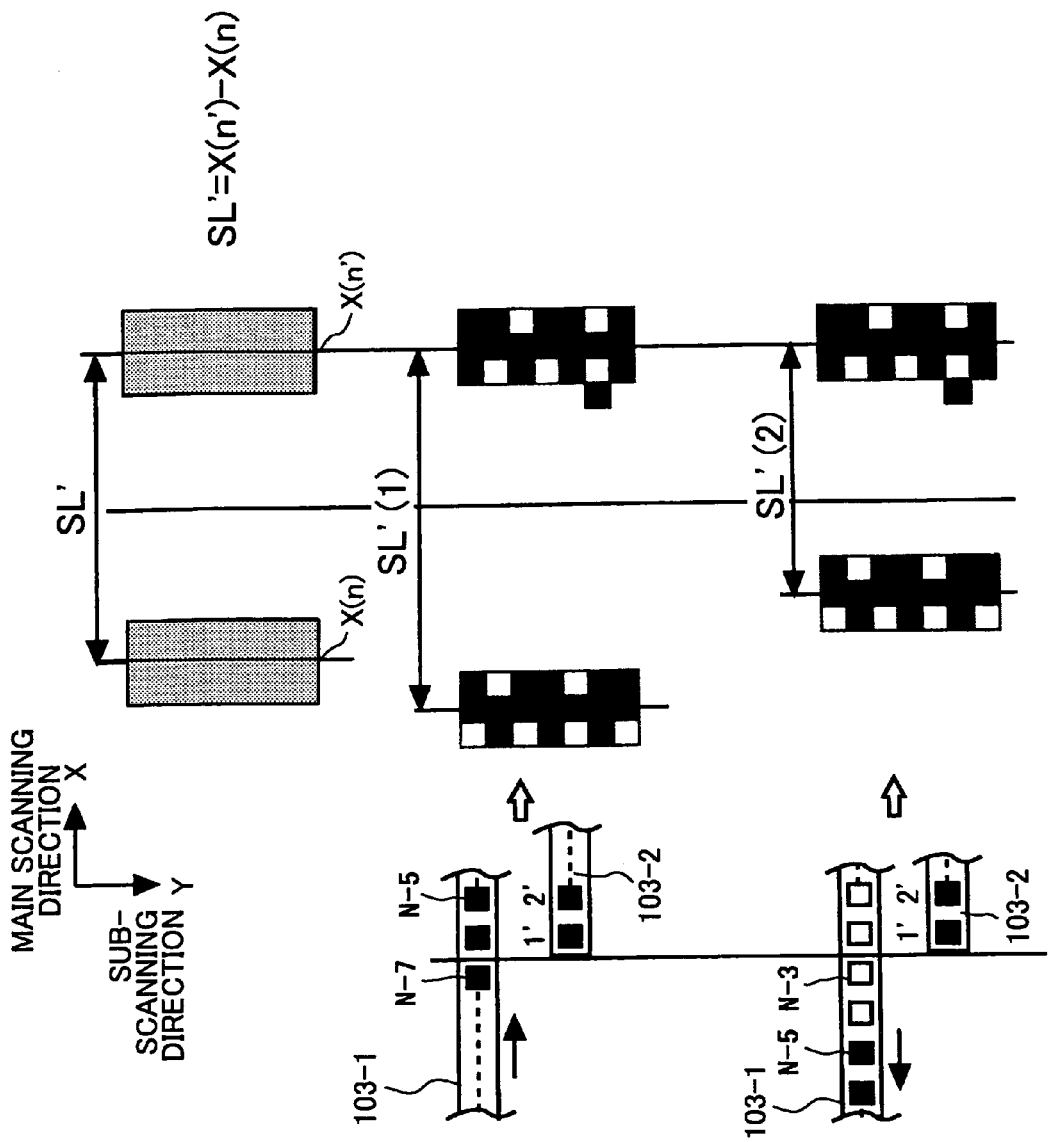
FIG. 7A through FIG. 7C are diagrams showing parallel line patterns of the reference sheet to be compared, which is recognized in a region a located at the joint of the first read sensor and the second read sensor.

FIG. 7A through FIG. 7C are diagrams showing parallel line patterns of the reference sheet to be compared, which is recognized in the region a located at the joint of the first read sensor 103-1 and the second read sensor 103-2. First, by using the parallel line pattern image of the first read sensor 103-1 and the second read sensor 103-2, which is recognized in the region a, the control circuit 154 obtains X(n) and X(n') each of which is an X-coordinate for a line image of each parallel line. Since a line pattern read from the reference sheet has a width in an X direction and a read density difference among dots, it is preferable to precisely obtain the x coordinate of each straight line by a centroid method. Next, based on this obtained x coordinate, the interval SL' in the main scanning direction with respect to the parallel line pattern located to be parallel the sub-scanning direction of the reference sheet to be compared is obtained by using the following expression (2):

$$SL'=X(n')-X(n) \quad \text{expression (2)}$$

In this case, the control circuit 154 obtains the x coordinate every one line in a y direction (sub-scanning direction), and calculates an average of the x coordinates of a plurality of lines, so as to improve an accuracy.

Next, the control circuit 154 compares the reference interval pattern SLM in the main scanning direction of the reference sheet previously obtained as a reference, with the interval SL' in the region a of the reference sheet to be compared in the main scanning direction calculated by causing the first read sensor 103-1 and the second read sensor 103-2 to read the reference sheet. The control circuit 154 obtains a difference between the intervals Sl' and SLM as a correction value ΔL by calculating the following expression (3):

$$\Delta L=SL'-SLM \quad \text{expression (3)}$$

Also, the reference interval pattern SLM in the main scanning direction can be obtained by calculating similarly to the above expression (2).

By using the correction value ΔL of the region a at the joint of the first read sensor 103-1, which is not fixed, and the second read sensor 103-2, which is fixed, the start pixel and the end pixel to read image data by the read sensor 103-1, which is not fixed, are corrected and defined. Accordingly, the start pixel and the end pixel of the first read sensor 103-1 are adjusted. Also, in the same manner described above, with respect to the region b located at the joint of the first read sensor 103-3, which is not fixed, and the second read sensor 103-2, which is fixed, the correction value ΔL between the start pixel and the end pixel of the first read sensor 103-3, which is not fixed, is obtained. By using the correction value ΔL of the region b, the start pixel and the read pixel of the first read sensor 103-3, which is not fixed, are corrected and defined. Accordingly, the start pixel and the end pixel of the first read sensor 103-3 are adjusted.

At the joints of adjacent sensors of the read sensors 103-1 through 103-3, if each interval SL of the parallel line patterns P1 and P2, which are arranged to be read by the adjacent sensors of the read sensors 103-1 through 103-3, is a predetermined value, the interval SL is set as the reference interval pattern in the main scanning direction, and the correction value ΔL of the start pixel and the end pixel of each of the read sensors 103-1 through 103-3 can be obtains as follows:

$$\Delta L=SL'-SL \quad \text{expression (4)}$$

Figure 6B:
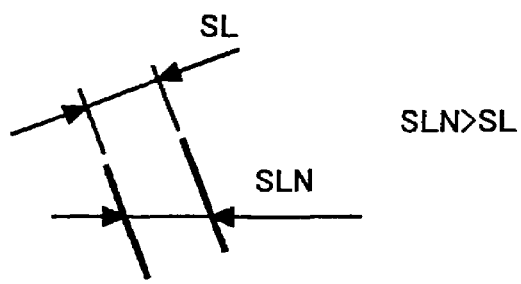
FIG. 6B is a diagram showing an interval between two parallel lines being read in each of parallel line pattern images obtained when a reference sheet is skewed.

However, for example, as shown in FIG. 6B, when the reference sheet is skewed, an interval of two parallel lines being read in each of the parallel line pattern images P1 and P2 is obtained while the control circuit 154 recognizes these two parallel lines to be parallel to the x coordinate, and becomes an interval SLN. As a result, the interval SLN is greater than the reference interval SL, and an error occurs to the correction value ΔL. Moreover, in a case in that the interval between two lines in the parallel line pattern is extended or reduced by temperature and relative humidity of the reference sheet, if each reference interval SL of the parallel line patterns P1 and P2 of the reference sheet is not measured before the reference sheet is read, the error occurs similar to the previous case.

Accordingly, in the embodiment, the parallel line pattern P, in which the interval SL identical to the interval SL for the parallel line patterns P1 and P2, is arranged within a range of one of the read sensors 103-1 through 103-3 other than the joints of the read sensors the read sensors 103-1 through 103-3. The control circuit 154 recognizes a parallel line pattern image in the region c of the parallel line pattern P, and defines the interval SLM obtained in the above-described method as the reference interval pattern in the main scanning direction. Therefore, even in a case in that the reference interval pattern of the reference sheet is extended or reduced due to the temperature and relative humidity, the error can be suppressed with respect to the reference interval pattern in the main scanning direction.

Next, the adjustment method for correcting and defining the start pixel and the end pixel will be described with reference to FIG. 7B and FIG. 7C. FIG. 7B shows a parallel line pattern image in a case in that the end pixel of the image data read by the first read sensor 103-1, which is not fixed, is overlapped with two pixels of the second read sensor 103-2 in the main scanning direction. When SL denotes the reference interval pattern in the main scanning direction, and SL'(1) denotes the interval of the parallel line pattern read in the region a, a correction value ΔL(1) for the start pixel and the end pixel of the first read sensor 103-1 can be obtained by the following expression (5):

$$\Delta L(1)=SL'(1)-SL=2 \quad \text{expression (5)}$$

Since two pixels are duplicated and read from the end pixel, which is a proper end pixel of the first read sensor 103-1, the interval SL'(1) is extended along the main scanning direction. Accordingly, it is required to correct the end pixel by subtracting two pixels from the start pixel and the end pixel of the first read sensor 103-1. However, the start pixel of the first read sensor 103-1 is corrected to be a second pixel (4−2=2), and the end pixel of the first read sensor 103-1 is corrected to be an N−7th pixel (N−5−2=N−7).

FIG. 7C shows the parallel line pattern image in a case in that the end pixel of the image data read by the first read sensor 103-1, which is not fixed, distances two pixels in the main scanning direction far from the second read sensor 103-2, which is fixed, in the region a. When the interval of the parallel line pattern in this case is denoted as SL'(2), the correction value ΔL(2) for the start pixel and the end pixel of the first read sensor 103-1 can be obtained by the following expression (6):

$$\Delta L(2)=SL'(2)-SL=-2 \quad \text{expression (6)}$$

Since the image data are read at two pixels from the end pixel, which is a proper end pixel of the first read sensor 103-1, and the interval SL'(2) is reduced along the main scanning direction. Accordingly, it is required to add two pixels to the start pixel and the end pixel of the first read sensor 103-1. Therefore, the start pixel of the first read sensor 103-1 is corrected to be a sixth pixel (4+2=6), and the end pixel is corrected to be an N−3th pixel (N−5+2=N−3).

As described above, not only the end pixel but also the start pixel are corrected to be set. The ranges H1 and H3 for the first read sensors 103-1 and 103-2, which are not fixed, are not changed, and the range H2 for the second read sensor 103-2, which is fixed, is constant. Therefore, it is possible to constantly maintain the range H being available to be read for the image reading device 50a.

As described above, in an available read range (for example, range H) in a line which combines a plurality of ranges (for example, the ranges H1 through H3) for a plurality of read sensors (for example, the read sensors 103-1 through 103-3), any one of the read sensors is selectively defined to have a fixed start pixel and a fixed end pixel to read image data. For other ranges for the read sensors, the start pixel and the end pixel are corrected and defined, so that each of the other ranges for the read sensors can be maintain as a constant range. As a result, it is possible to easily maintain the available read range in a line which combines the ranges of the read sensors as a constant range.

Figure 1:
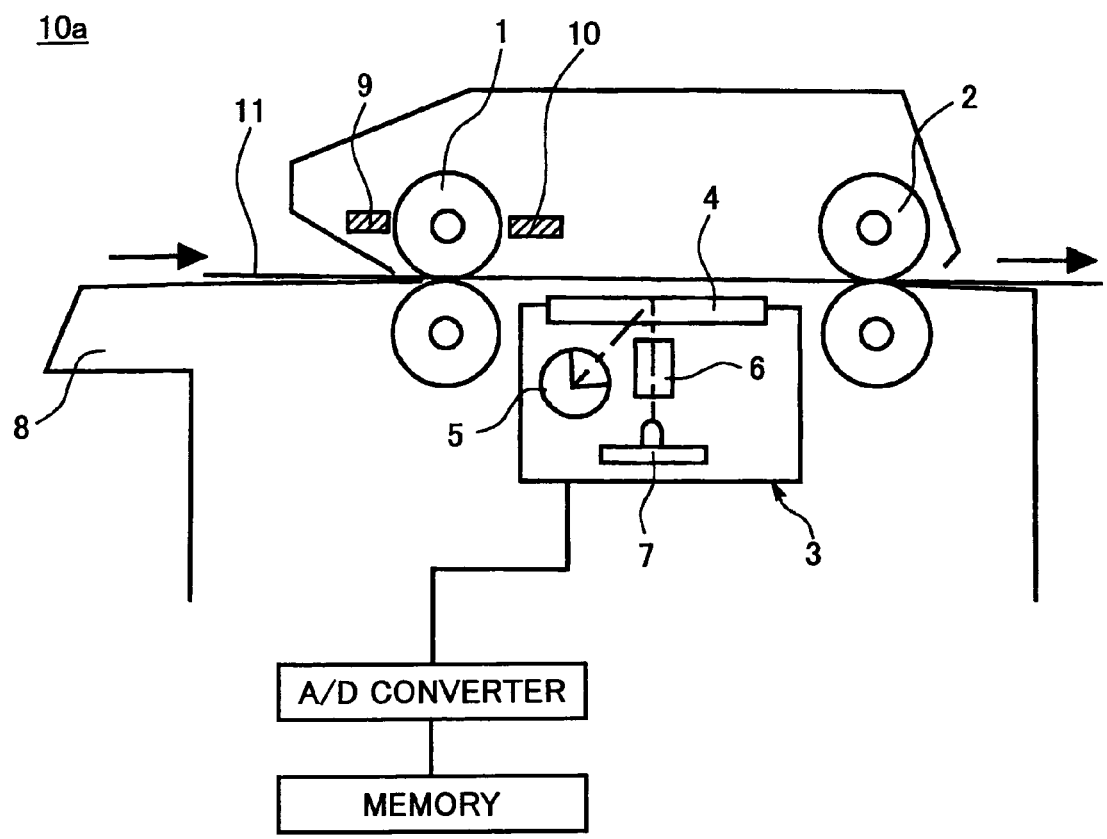
FIG. 1 is schematic diagram showing a configuration example of an image reading device.
Figure 2A:
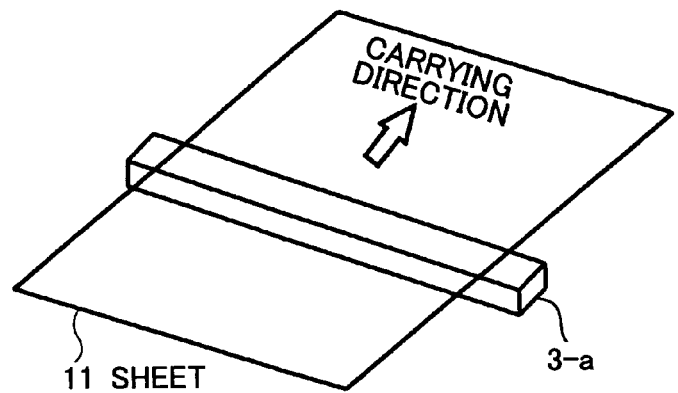
FIG. 2 is a diagram for explaining a first to third types of the image reading device.
Figure 2B:
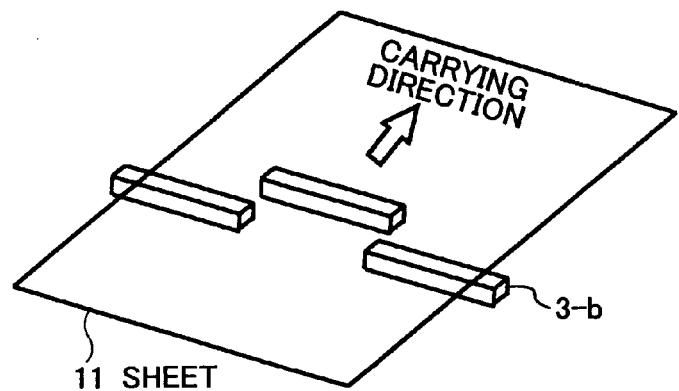
Figure 2C:
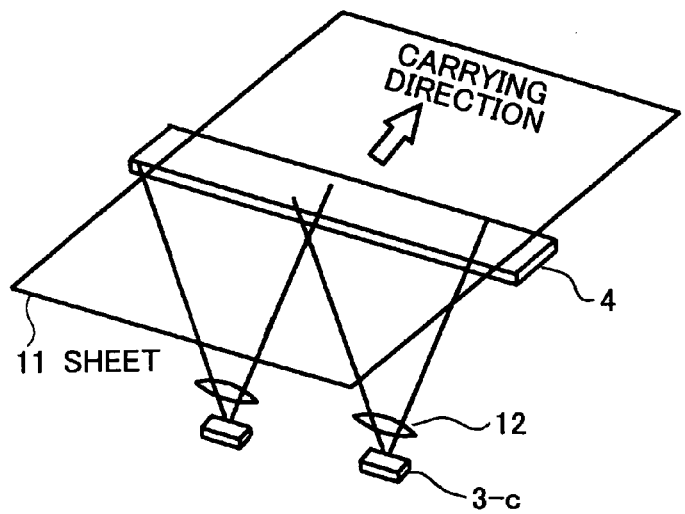
Figure 3A:
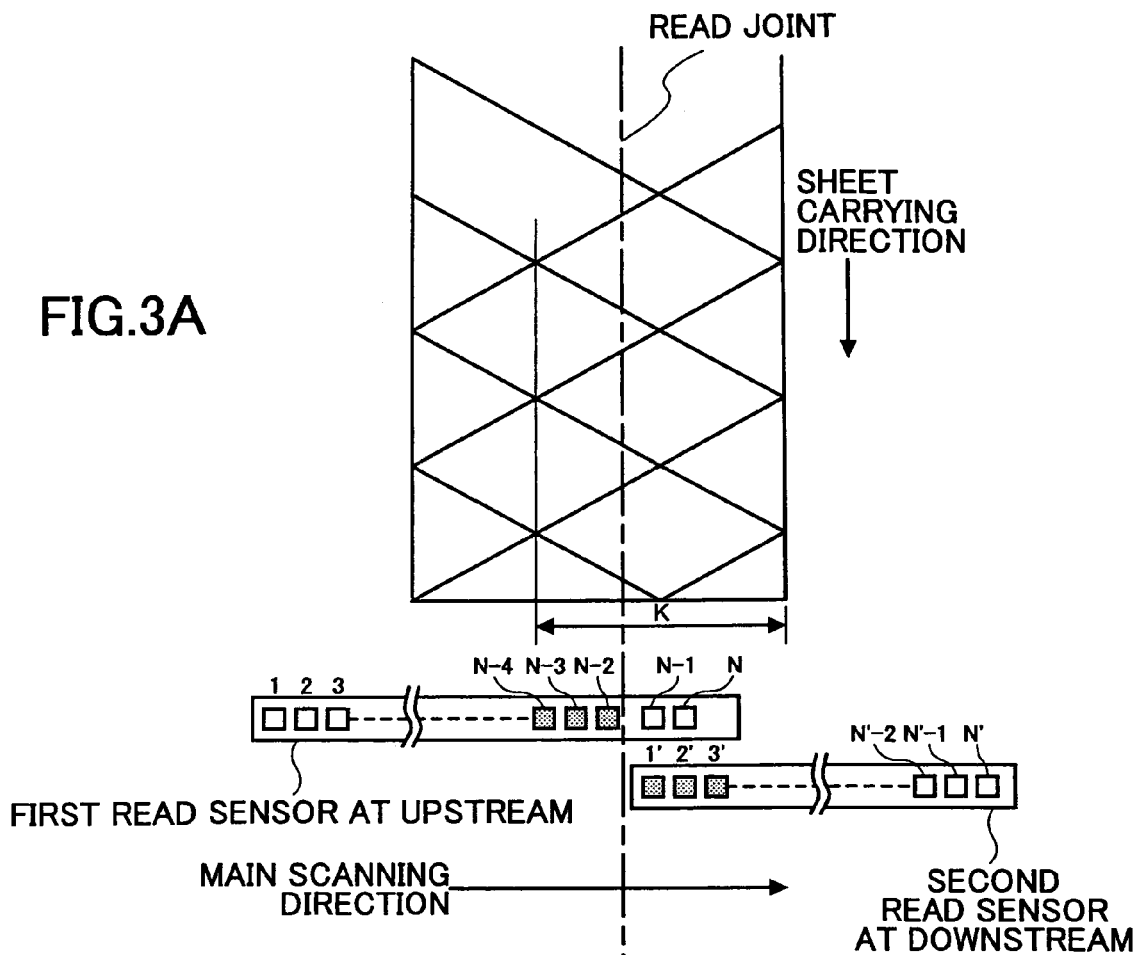
FIG. 3 is a diagram showing a case in that settings for the start pixel and the end pixel are not precise at joints of read sensors.
Figure 3B:
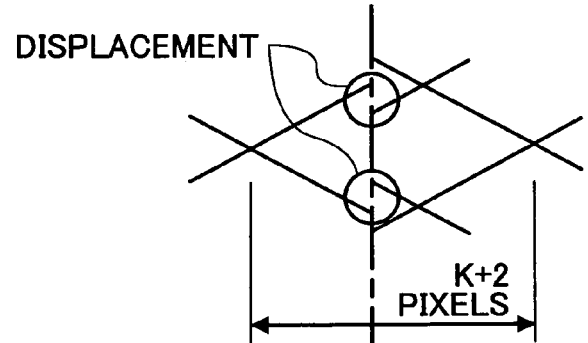
Figure 3C:
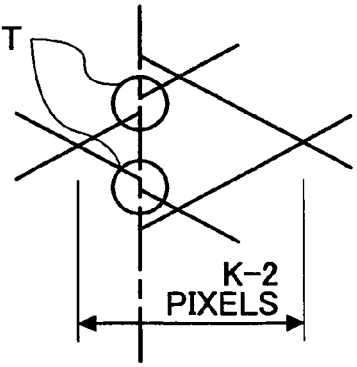

Alternatively, instead of the parallel line pattern having two parallel lines in the sub-scanning direction such as the reference sheet, as shown in FIG. 3A through FIG. 3C, two intersection points of the diamond-shaped image, which does not have parallel lines in the sub-scanning direction, are defined as two reference points, and an interval between two reference points is obtained. The interval of the diamond-shaped image is defined as a reference interval pattern, so that in the same manner as the above-described adjustment method, the correction value for the start pixel and the end pixel for the first read sensors 103-1 and 103-3 are obtained, so as to correct the start pixel and the end pixel.

Figure 8:
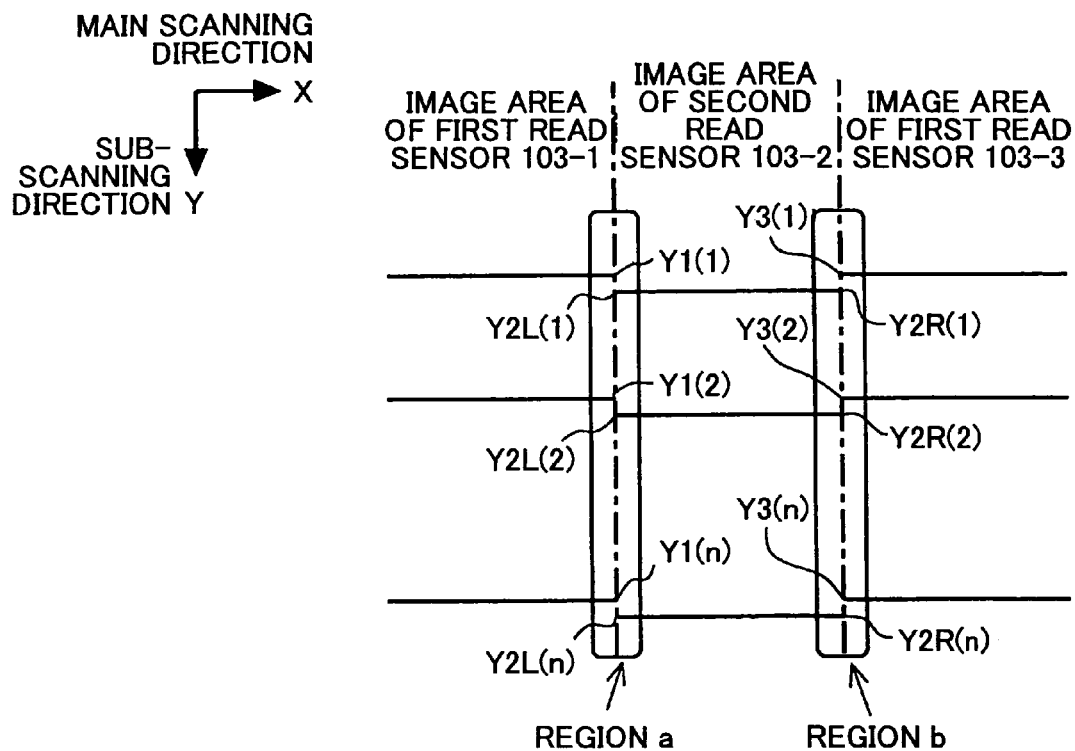
FIG. 8 is a diagram for explaining a method for obtaining a displacement amount in a sub-scanning direction based on y coordinate values at joints of the straight line patterns.
Figure 9:
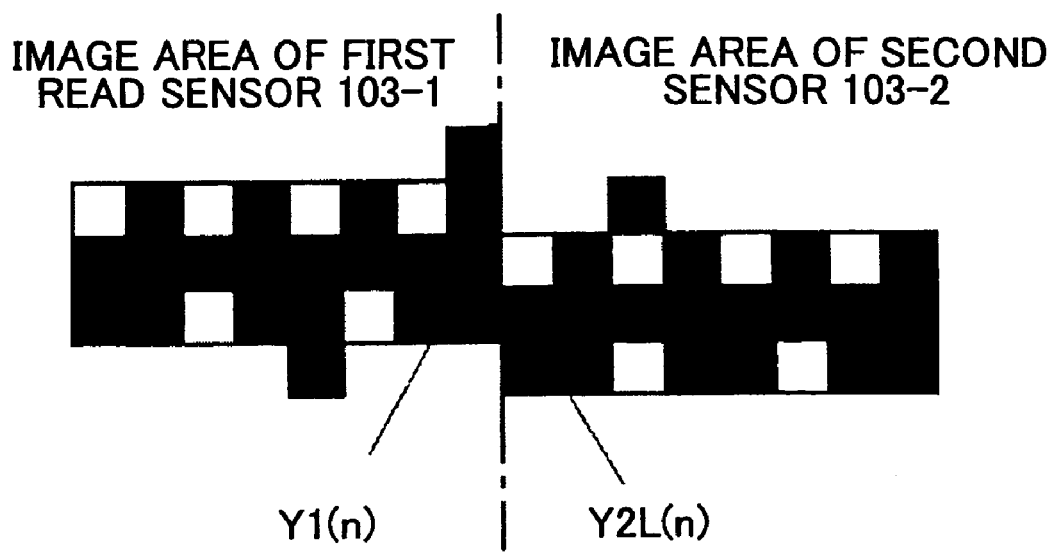
FIG. 9 is a diagram for explaining a read density difference for a width in a y direction and every dot unit of the straight line pattern.

Subsequently, as a sub-scanning adjustment method according to the present invention, a displacement correction operation in the sub-scanning direction for the first read sensors 103-1 and 103-3 and the second read sensor 103-2 will be described with reference to FIG. 8, FIG. 9, FIG. 10, and FIG. 11. First, a sheet showing a plurality of straight line patterns orthogonal to a sheet carrying direction (sub-scanning direction) shown in FIG. 6A is read in the image reading device 50a. Next, a composite image is stored in the page memory 152 of the adjustment device 150, and the control circuit 154 recognizes the straight patterns in a region d' and a region e', which are distanced from the sheet edge 11e show in FIG. 6A. Next, as y coordinate values at joints of the read sensors at the straight line patterns which are recognized by the control circuit 154, as shown in FIG. 8, values $Y1(n)$, $Y2L(n)$, $Y2R(n)$, and $Y3(n)$ are obtained. FIG. 8 is a diagram for explaining a method for obtaining a displacement amount in the sub-scanning direction based on the y coordinate values at the joints of the straight line patterns. As shown in FIG. 9, there is a difference of a read density for a width in a y direction and every dot unit in each of the straight patterns read by the first read sensor 103-1 and the second read sensor 103-2. Accordingly, the centroid method is preferably used to precisely obtain the y coordinate value of each straight line. FIG. 9 is a diagram for explaining a read density difference for the width in the y direction and every dot unit of the straight line pattern. Based on the above-described y coordinate value, an average value R12 of the displacement amount in the sub-scanning direction between the first read sensor 103-1 and the second read sensor 103-2 is obtained by the following expression (7):

$$R12 = \Sigma(Y1(n) - Y2L(n))/n \qquad \text{expression (7)}$$

An average value R32 of the displacement amount between first read sensor 103-3 and the second read sensor 103-2 is obtained by the following expression (8):

$$R32 = \Sigma(Y3(n) - Y2R(n))/n \qquad \text{expression (8)}$$

The average values R12 and R32 are defined as delay amounts, and the delay amounts showing average values R12 and R32 are set to the delay circuits 141 and 142, respectively, as correction values by an input unit (not shown) of the image reading device 50a in order to correct the displacement amounts.

The average values R12 and R32 are obtained by calculating relative displacement amounts in the sub-scanning direction of the plurality of straight line images, and calculating arithmetic averages as average values of relative displacement amounts. Therefore, even if a carrying speed is not uniform during a distance in the sub-scanning direction of the first read sensors 103-1 and 103-3 and the second read sensor 103-2, the average values R12 and R32 are averaged delay amounts with respect to displacements in the sub-scanning direction at the carrying speed. Therefore, it is possible to correct the displacements, which are caused in an image combined on one line to form a composite image, in the sub-scanning direction at the joints of the read sensors 103-1 through 103-3 without bias.

Moreover, because of the following reasons, the delay amounts are determined by using data of the straight line patterns in the region d' and the region e' that are distanced from the sheet edge 11e. In general, in order to avoid wrinkles caused while carrying a sheet, diameters of the second carriage rollers 102 are slightly greater than the diameters of the first carriage roller 101, and a sheet surface is always pulled and carried by a pulling effect of the second carriage rollers 102. Since the sheet 111 is carried only by the first carriage rollers 101 which diameters are smaller than the diameters of the second carriage rollers 102, a carrying speed before the sheet 111 is clamped by the second carriage rollers 102 is slower than a speed after the sheet 111 is clamped by the second carriage rollers 102.

In this case, as shown in FIG. 4A and FIG. 4B, an image area of the sheet 111, which is read until the sheet 111 is clamped by the second carriage rollers 102, is in a region of the distance LL in the sub-scanning direction of the first read sensors 103-1 and 103-3. The region of the distance LL in the sub-scanning direction is a region slightly distance from the sheet edge 11e. If the delay amounts are determined by using image data showing the straight line patterns in the region d' and the region e' which are regions other than the region of the distance LL in the sub-scanning direction and are distanced far from the sheet edge 11e, it is possible to correct an image while covering a larger range other than the region of the distance LL in the sub-scanning direction from the sheet edge 11e.

Figure 10:
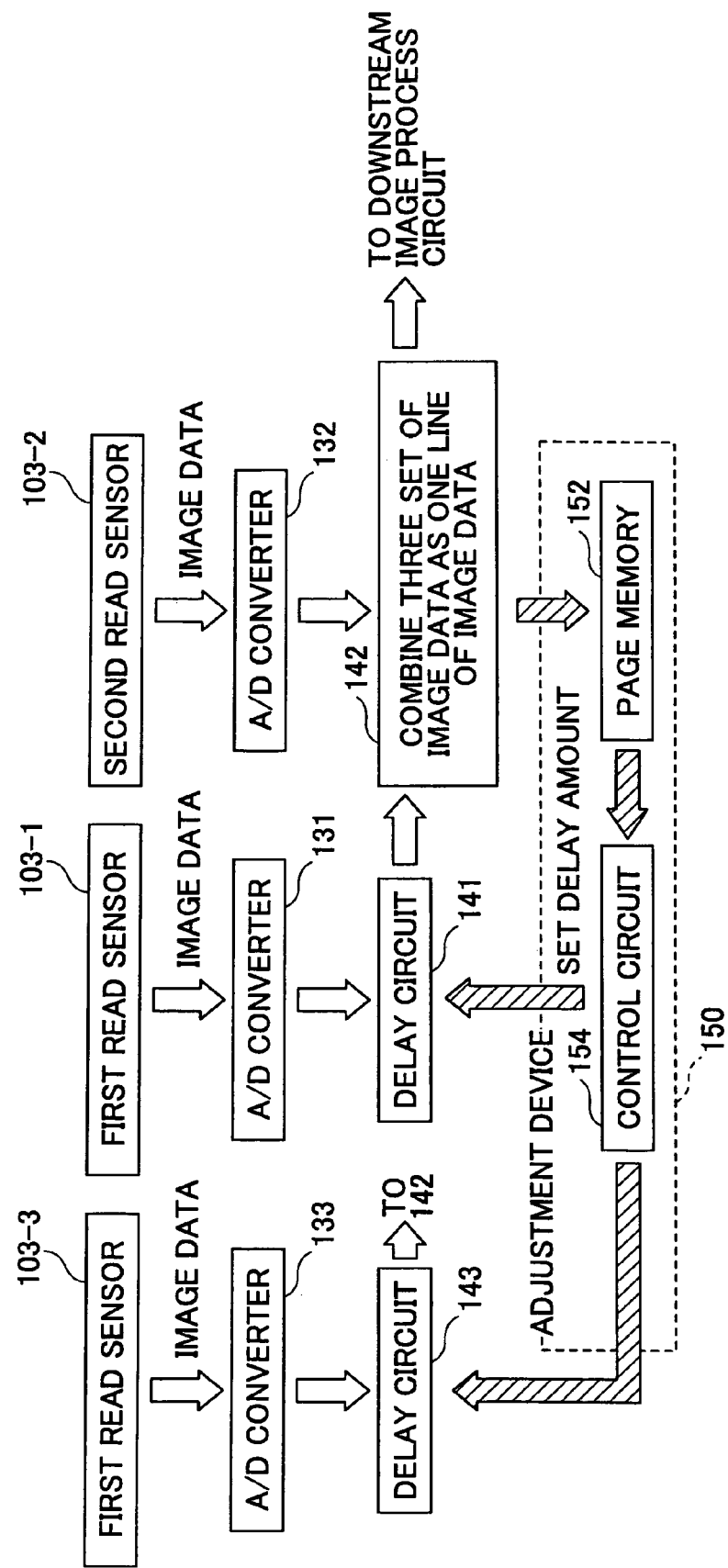
FIG. 10 is a block diagram for explaining an adjustment method for determining the delay amount for the first read sensors of the image reading device according to the embodiment of the present invention.

FIG. 10 is a block diagram for explaining an adjustment method for determining the delay amount for the first read sensors 103-1 and 103-3 of the image reading device according to the embodiment of the present invention. In order to obtain the delay amount for the image data read by the first read sensors 103-1 and 103-3, the image reading device 50a includes a page memory 152 for maintaining image data read by the read sensors 103-1 through 103-3, and a control circuit 154 for determining the delay amount based on the image data maintained in the page memory 152 and setting the delay amount to each of the delay circuits 141 and 143 The image data read by the first read sensors 103-1 and 103-3 are converted into digital signals having 256 colors at A/D converter 131 and 133, respectively. Each of delay circuits 141 and 143 delays by lines corresponding to an average value of the relative displacement amount to which an arithmetic average is conducted by obtaining a plurality of displacement amounts L in the sub-scanning direction. Each of the digital signals is sent to a circuit 142. Image data read by the second read sensor 103-2 is converted into a digital signal by an A/D converter 132, and the digital signal showing the image data is sent to the circuit 142. By synchronizing with an output of an image read by the second read sensor 103-2, the circuit 142 combines three partial images to form one line, and sends one line to a downstream image process circuit. In this case, as described above, the number of lines (line number) to be delayed is a value obtained by dividing the displacement amount L by a read density.

Figure 11:
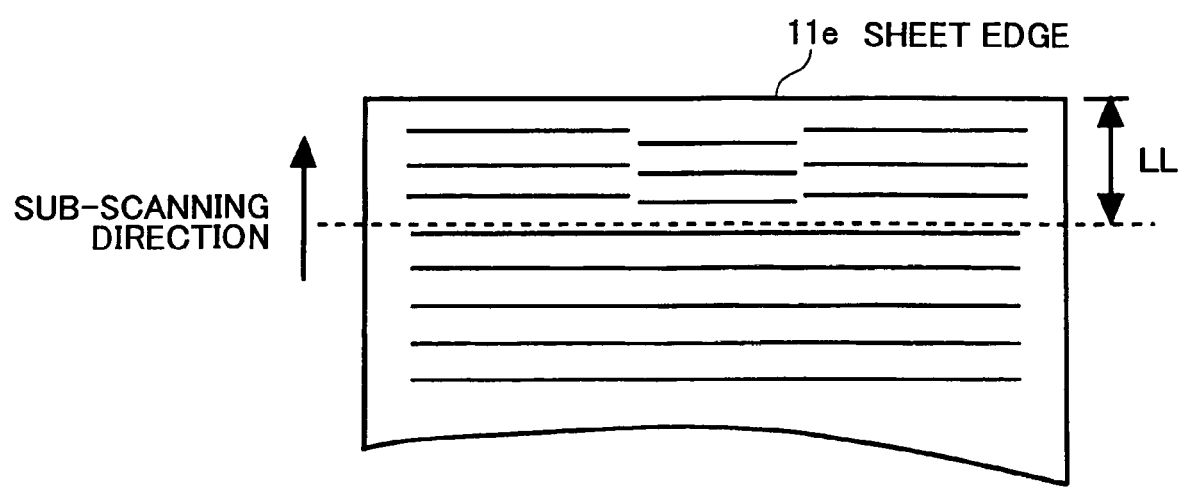
FIG. 11 is a diagram showing image displacements at joints of the read sensors, which are caused by a carrying speed difference between the first carriage rollers and the second carriage rollers.

FIG. 11 is a diagram showing image displacements at joints of the read sensors 103-1 through 103-3, which are caused by a carrying speed difference between the first carriage rollers 101 and the second carriage rollers 102. The region of the distance LL in the sub-scanning direction is read while being carried by the first carriage rollers 101 slower than the second carriage rollers 102. Accordingly, in a case of combining partial image data read by the first read sensor 103-1, partial image data read by the first read sensor 103-3, and partial image data read by the second read sensor 103-2 while synchronizing with the carrying speed of the second carriage rollers 102, in the region of the distance LL in the sub-scanning direction, partial images read by the first read sensors 103-1 and 103-3 are displaced and are preceded in the carrying direction. For example, as shown FIG. 4A and FIG. 4B, in a case in that each of the second carriage rollers 102 has a diameter Φ30.5 mm, the first carriage rollers 101 has a diameter Φ30 mm, and the distance L in the sub-scanning direction between the first read sensors 103-1 and 103-3 and the second read sensors 103-2 is 30 mm, since the diameter of the second carriage rollers 102 is 0.17% greater than the diameter of the first carriage rollers 101, the displacement amount becomes approximately 50 μm. When the sheet 111 is read with 600 dpi resolution (42.3 μm per pixel), the displacement amount becomes barely greater than one line.

In the embodiment, referring to FIG. 4A and FIG. 4B, rotation drives of the first and second carriage rollers 101 and 102 are controlled by a control unit (not shown). That is, the sheet 111 is detected by a first paper detector 109 while the first and second carriage rollers 101 and 102 are rotated by a stepping spindle motor 116 capable of controlling a rotation speed, through a first drive pulley 114, a second drive pulley 115, and a timing belt 117. The first and second carriage rollers 101 and 102 start to rotate. The carrying speed of the first carriage roller 101 is increased to be the same as the carrying speed of the second carriage roller 102 until the sheet edge 11e is detected by a second paper detector 110 and the sheet 111 is clamped by the second carriage roller 102, so that the carrying speed of the sheet 111 can be always constant. Therefore, it is possible to prevent the image displacement in the sub-scanning direction at each joint as shown in FIG. 11. Moreover, this increased speed amount can be obtained as follows. First, as shown in FIG. 6A, the plurality of the straight line patterns each pattern showing two parallel lines orthogonal to the sheet carrying direction are arranged in the range of the distance LL in the sub-scanning direction between the second carriage rollers 102 and the first read sensors 103-1 and 103-3 from the sheet edge 11e. In addition, a plurality of the straight line patterns are arranged within another range at an upper part of the sheet 111 in the sub-scanning direction and distanced from the range of the distance LL in the sub-scanning direction. The plurality of the straight line patterns with in another range are read. Next, the delay amounts R12 and R32 are average values of relative displacement amounts in the region d' and the region e' distanced from the region of the distance LL from the sheet edge 11e, which are obtained by the above-described expressions (7) and (8). Also, delay amounts R'12 and R'23 are average values of relative displacement amounts in a region d and a region e within the range of the distance LL from the sheet edge 11e, which are obtained in the same manner of the above-described expressions (7) and (8). Accordingly, the increased speed amounts are obtained by calculating the following expressions (9) and (10).

$$(R12-R'12)/R12\times100(\%) \quad \text{expression (9)}$$

$$(R23-R'23)/R32\times100(\%) \quad \text{expression (10)}$$

The input unit of the image reading device 50a sets the increase amounts to the control unit controlling the rotation drives of the first carriage rollers 101 and the second carriage rollers 102, so that the sheet carrying speed always becomes constant. Therefore, it is possible to prevent the displacements in the sub-scanning direction at the joints of the read sensors 103-1 through 103-3 as shown in FIG. 11. In addition, in the entire joints of the read sensors 103-1 through 103-3, it is possible to obtain a higher quality image which does not have a displacement caused by a duplicated pixel or a dropped pixel.

According to the embodiment of the present invention, the start pixel and the end pixel of each of the read sensors 103-1 through 103-3, and the delay amounts of the image data in the sub-scanning direction can be automatically determined. Therefore, without spending time and workload, which eventually make the production cost higher, and various discretions of operators, it is possible to precisely determine the start pixel and the end pixel of each of the read sensors 103-1 through 103-3, and the delay amounts of the image data in the sub-scanning direction. Moreover, it is possible to obtain the higher quality image which does not have the image displacement caused by the duplicated pixel and the dropped pixel at each of joints of the read sensors 103-1 through 103-3. Therefore, it is possible provide the adjacent method for the image reading device 50a providing an improved convenience, and the image reading device and an image forming apparatus applying the adjustment method.

Figure 12:
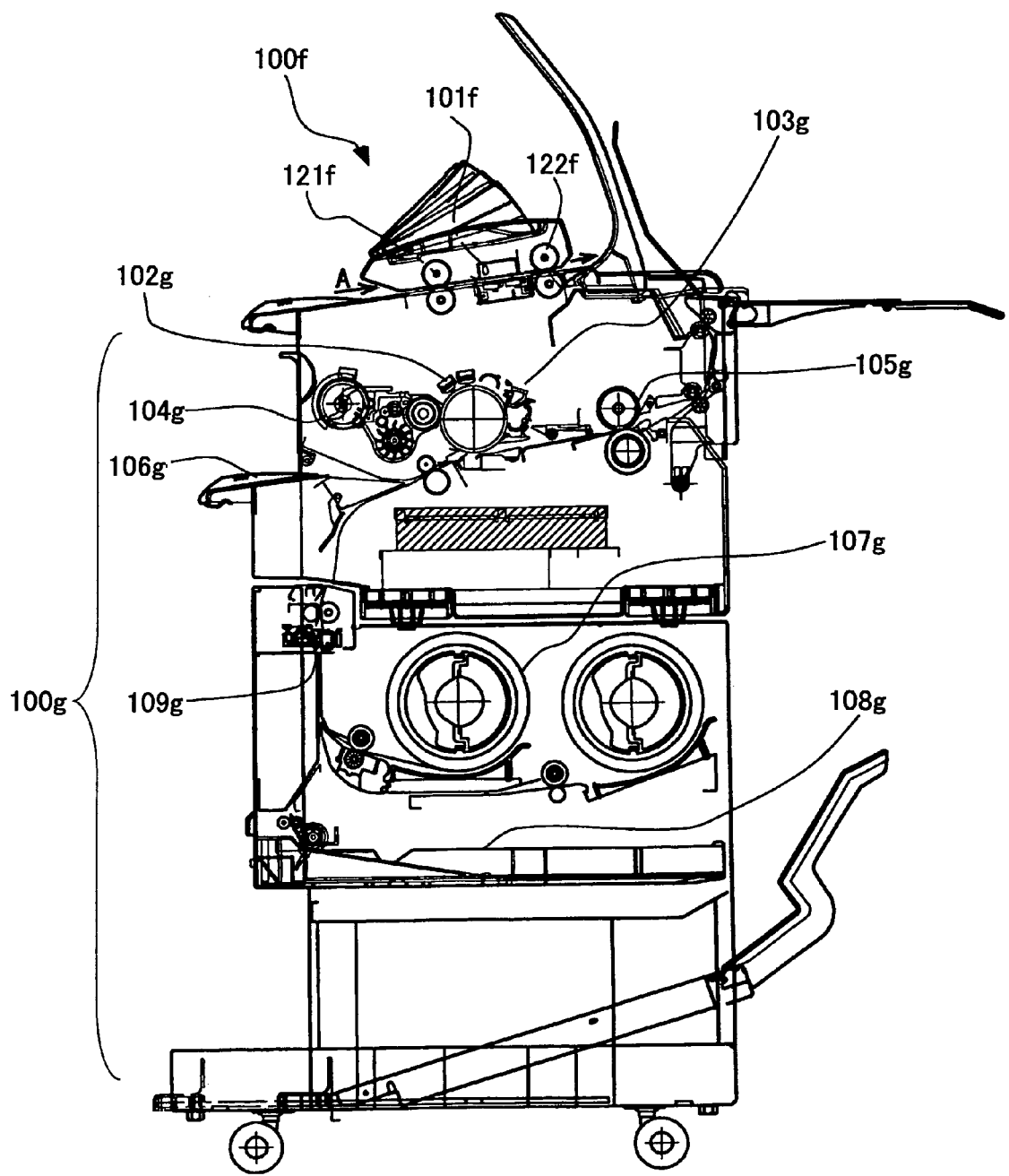
FIG. 12 is a schematic diagram showing a configuration of an image forming apparatus including an image reading device according to the embodiment of the present invention.

FIG. 12 is a schematic diagram showing a configuration of an image forming apparatus 100g including an image reading device 100f according to the embodiment of the present invention.

An image reading device 100f includes a first carriage rollers 121f for carrying a sheet in a sheet carrying direction A toward a reading part 101f when the sheet is inserted from a sheet inlet, a reading part 101f including a plurality of read sensors, which are arranged to be staggered and reading the sheet being carried, a combining unit for combining partial images read by the plurality of read sensors, and second carriage rollers 122 for carrying the sheet, which has been already read, toward an opposite direction to the sheet inlet. The plurality of read sensors includes one or more first read sensors arranged on one predetermined line along a longitudinal direction in a main scanning direction at an upstream and one or more second read sensors arranged on another predetermined line along a longitudinal direction in the main scanning direction at a downstream. For available image data, each of read sensors are alternatively assigned in the sub-scanning direction every one sensor to be one of the first read sensors and one of the second read sensors to form a stagger arrangement, so that the start pixel and the end pixel of one or more first read sensors are overlapped with the start pixel and the end pixel of one or more second read sensors. In this staggered form by the first and second read sensors, image data read by each of the first read sensors are delayed, and the combining unit combines the image data of the first read sensors with image data read by each of the second read sensors to form a composite image on one line.

The image forming apparatus 100g includes an image forming part 103g for forming an image corresponding to an image read signal, which is electrically converted from read information by the image reading device 100f, onto an image carriage by a writing part 102f, a developing part 104g for conveying a developer by carrying the developer on a surface of a developing roller to a develop area opposite to the image carriage, and for converting an electrostatic latent image formed on the image carrier into a visible image, and a fixing part 105g for fixing a toner image (the visible image) to a record sheet. The image forming apparatus 100g shown in FIG. 12 corresponds to an A0 size of a drawing sheet. A roll paper feeder 107*g* cuts a roll sheet to make the A0 size of a sheet by using a cutter 109*g* and transfers the A0 size of the sheet as the record sheet. A cassette paper feeder 108*g* corresponds to an A3 size of the sheet. It should be noted that the image forming apparatus 100*g* can be any one of an electrophotographic method and an ink-jet recording method, and includes the image reading device 100*f* applying the adjustment method according to the present invention. Therefore, it is possible to obtain a higher quality image without the image displacement, and also possible to improve a convenience to adjust a read image.

According to the present invention, a displacement amount of an image is easily measured at each joint of the plurality of reading sensors Accordingly, it is possible to suppress various discretions of operators with respect to a measurement result. Moreover, the start pixel and the end pixel to read image data in the main scanning direction are precisely determined and adjusted. Furthermore, it is possible to obtain precise relative displacement amount of line images orthogonal to the sub-scanning direction, so as to precisely combine partial images.

In addition, a delay amount of image data in the sub-scanning direction can be precisely set as well as the start pixel and the end pixel to read the image data in the main scanning direction. Therefore, it is possible to obtain a higher quality image which does not have an image displacement caused by a duplicated pixel and a dropped pixel. As described above, the present invention can provide an adjustment method conducted in the image reading device which improves a convenience of adjusting the plurality of first read sensors and the plurality of second read sensors, and the image reading device and the image forming apparatus implementing the adjustment method.

The present invention is not limited to the specifically disclosed embodiments, and variations and modifications may be made without departing from the scope of the present invention.

The present application is based on the Japanese Priority Applications No. 2004-260414 filed on Sep. 8, 2004, No. 2004-260415 filed on Sep. 8, 2004, No. 2005-198207 filed on Jul. 7, 2005, and No. 2005-207941 filed on Jul. 19, 2005, the entire contents of which are hereby incorporated by reference.

What is claimed is:

1. An adjustment method conducted in an image reading device including a first carrying part configured to carry a sheet inserted from a sheet inlet to a reading part, a plurality of reading parts including one or more first reading parts arranged along one line at an upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts, and a combining part configured to delay image data read by the one or more first reading parts of the plurality of reading parts arranged to be staggered, and to combine image data read by the one or more first reading parts and the one or more second reading parts, and a second carrying part configured to carry the sheet toward a direction opposite to the sheet inlet, said adjustment method comprising:

determining a reference interval between two parallel lines in a main scanning direction, the two parallel lines extending along a sub-scanning direction and being shown as a parallel line pattern;

calculating each parallel line image interval between two parallel line images shown in each of parallel line pattern images obtained by reading the sheet so that each joint of the one or more first reading parts and the one or more second reading parts is placed between the two parallel line images;

comparing the reference interval in the main scanning direction with the parallel line image interval;

determining the start pixel and the end pixel to read the image data at each joint of the one or more first reading parts and the one or more second reading parts by obtaining an interval difference between the reference interval and the parallel line image interval for the each joint so as to adjust the plurality of reading parts;

comparing a reference straight line extending along the main scanning direction with each of a plurality of straight line images extending along the main scanning direction at each joint of the one or more first reading parts and the one or more second reading parts, the plurality of straight line images obtained by causing the plurality of reading parts to read the sheet;

obtaining an average value of relative displacement amounts by calculating displacement amounts of the plurality of straight line images in the sub-scanning direction and by calculating an arithmetic average of the displacement amounts;

determining the average value of the relative displacement amounts as a delay amount of the image data read by the one or more first reading parts; and adjusting a delay time for the one or more first reading parts, the delay time being used by the combining part.

2. The adjustment method as claimed in claim 1, wherein:

the start pixel and the end pixel to read the image data of the one or more first reading parts or the one or more second reading parts are fixed at the joints of the one or more first reading parts and the one or more second reading parts, by determining and correcting the start pixel and the end pixel, which are not fixed, to read the image data of the one or more first reading parts or the one or more second reading parts, the start pixel and the end pixel to read the image data by each of the plurality of reading parts are maintained to be constant, and an available read range is maintained to be constant as one line connecting ranges of the plurality of reading parts.

3. An image reading device including a first carrying part configured to carry a sheet inserted from a sheet inlet to a reading part, a plurality of reading parts including one or more first reading parts arranged along one line at an upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts, and a combining part configured to delay image data read by the one or more first reading parts of the plurality of reading parts arranged to be staggered, and to combine image data read by the one or more first reading parts and the one or more second reading parts, and a second carrying part configured to carry the sheet toward a direction opposite to the sheet inlet, said image reading device, comprising:

an adjustment control part configured to adjust the plurality of reading parts, wherein the adjustment control part is configured to determine a reference interval between two parallel lines in a main scanning direction, the two parallel lines extending along a sub-scanning direction and being shown as a parallel line pattern, to calculate each parallel line image interval between two parallel line images shown in each of parallel line pattern images obtained by reading the sheet so that each joint of the one or more first reading parts and the one or more second reading parts is placed between the two parallel line images, to compare the reference interval in the main scanning direction with the parallel line image interval, to determine the start pixel and the end pixel to read the image data at each joint of the one or more first reading parts and the one or more second reading parts by obtaining an interval difference between the reference interval and the parallel line image interval for the each joint so as to adjust the plurality of reading parts, to compare a reference straight line extending along the main scanning direction with each of a plurality of straight line images extending along the main scanning direction at each joint of the one or more first reading parts and the one or more second reading parts, the plurality of straight line images obtained by causing the plurality of reading parts to read the sheet, to obtain an average value of relative displacement amounts by calculating displacement amounts of the plurality of straight line images in the sub-scanning direction and by calculating an arithmetic average of the displacement amounts, to determine the average value of the relative displacement amounts as a delay amount of the image data read by the one or more first reading parts, and to adjust a delay time for the one or more first reading parts, the delay time being used by the combining part.

4. An image forming apparatus implementing either one of a electrophotographic method and an ink-jet recording method for forming an image corresponding to an image information signal read by an image reading device including a first carrying part configured to carry a sheet inserted from a sheet inlet to a reading part, a plurality of reading parts including one or more first reading parts arranged along one line at an upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts, and a combining part configured to delay image data read by the one or more first reading parts of the plurality of reading parts arranged to be staggered, and to combine image data read by the one or more first reading parts and the one or more second reading parts, and a second carrying part configured to carry the sheet toward a direction opposite to the sheet inlet, said image reading device further comprising:

an adjustment control part configured to adjust the plurality of reading parts, wherein the adjustment control part is configured to determine a reference interval between two parallel lines in a main scanning direction, the two parallel lines extending along a sub-scanning direction and being shown as a parallel line pattern, to calculate each parallel line image interval between two parallel line images shown in each of parallel line pattern images obtained by reading the sheet so that each joint of the one or more first reading parts and the one or more second reading parts is placed between the two parallel line images, to compare the reference interval in the main scanning direction with the parallel line image interval, to determine the start pixel and the end pixel to read the image data at each joint of the one or more first reading parts and the one or more second reading parts by obtaining an interval difference between the reference interval and the parallel line image interval for the each joint so as to adjust the plurality of reading parts, to compare a reference straight line extending along the main scanning direction with each of a plurality of straight line images extending along the main scanning direction at each joint of the one or more first reading parts and the one or more second reading parts, the plurality of straight line images obtained by causing the plurality of reading parts to read the sheet, to obtain an average value of relative displacement amounts by calculating displacement amounts of the plurality of straight line images in the sub-scanning direction and by calculating an arithmetic average of the displacement amounts, to determine the average value of the relative displacement amounts as a delay amount of the image data read by the one or more first reading parts, and to adjust a delay time for the one or more first reading parts, the delay time being used by the combining part.

5. An adjustment method conducted in an image reading device including a first carrying part configured to carry a sheet inserted from a sheet inlet to a reading part, a plurality of reading parts including one or more first reading parts arranged along one line at an upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts, a combining part configured to delay image data read by the one or more first reading parts of the plurality of reading parts arranged to be staggered, and to combine image data read by the one or more first reading parts and the one or more second reading parts, and a second carrying part configured to carry the sheet toward a direction opposite to the sheet inlet, an actuating part configured to rotate and actuate the first carrying part and the second carrying part, and a control part configured to control the first carrying part and the second carrying part, said adjustment method comprising:

calculating each displacement difference of a plurality of straight line images in a sub-scanning direction at the joints of the one or more first reading parts and the one or more second reading parts by reading a sheet showing a plurality of reference straight lines extending along a main scanning direction by the plurality of reading parts;

obtaining an average value of relative displacement amounts by calculating an arithmetic average of the displacement amounts;

determining the average value as a delay amount of the image data read by each of the one or more first reading parts; and adjusting a delay time of the one or more first reading parts for the combining part.

6. The adjustment method as claimed in claim 5, wherein:

a plurality of straight lines extending along the main scanning direction are arranged in a range for the sub-scanning direction, the range being from the second carrying part to the first reading parts and being distanced from a sheet edge, and a sheet arranging the plurality of straight lines at an upstream in the sub-scanning direction from the second carrying part to the one or more first reading parts within the range is read and stored in a storing unit;

a first average value of the relative displacement amounts in the sub-scanning direction is calculated based on the image data of each of the plurality of straight lines at the joints of the one or more first reading part and the one or more second reading parts within the range being from the second carrying part to the first reading parts and being distanced from the sheet edge;

a second average value of the relative displacement amounts in the sub-scanning direction is calculated based on the image data of each of the plurality of straight lines at the joints of the one or more first reading parts and the one or more second reading parts at the upstream in the sub-scanning direction within the range being from the second carrying part to the first reading parts and being distanced from the sheet edge;

a difference between the first average value and the second average value is obtained; and the first carrying part and the second carrying part are rotated and actuated so that each carrying speed of the sheet by the first carrying part and the second carrying part is constant.

7. An image reading device including a first carrying part configured to carry a sheet inserted from a sheet inlet to a reading part, a plurality of reading parts including one or more first reading parts arranged along one line at an upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts, a combining part configured to delay image data read by the one or more first reading parts of the plurality of reading parts arranged to be staggered, and to combine image data read by the one or more first reading parts and the one or more second reading parts, and a second carrying part configured to carry the sheet toward a direction opposite to the sheet inlet, an actuating part configured to rotate and actuate the first carrying part and the second carrying part, and a control part configured to control the first carrying part and the second carrying part, said image reading device comprising:

an adjustment control part configured to adjust the plurality of reading parts, wherein the adjustment control part is configured to calculate each displacement difference of a plurality of straight line images in a sub-scanning direction at the joints of the one or more first reading parts and the one or more second reading parts by reading a sheet showing a plurality of reference straight lines extending along a main scanning direction by the plurality of reading parts, to obtain an average value of relative displacement amounts by calculating an arithmetic average of the displacement amounts, to determine the average value as a delay amount of the image data read by each of the one or more first reading parts, and to adjust a delay time of the one or more first reading parts for the combining part.

8. An image forming apparatus implementing either one of a electrophotographic method and an ink-jet recording method for forming an image corresponding to an image information signal read by an image reading device including a first carrying part configured to carry a sheet inserted from a sheet inlet to a reading part, a plurality of reading parts including one or more first reading parts arranged along one line at an upstream and one or more second reading parts arranged along another line at a downstream in a longitudinal direction of the plurality of reading parts in a main direction for reading the sheet being carried by the first carrying part, wherein the plurality of reading parts are alternatively arranged to be one of the one or more first reading parts and the one or more second reading parts in order to form a staggered formation so that a start pixel and an end pixel to read image data are overlapped at joints between the one or more first reading parts and the one or more second reading parts, a combining part configured to delay image data read by the one or more first reading parts of the plurality of reading parts arranged to be staggered, and to combine image data read by the one or more first reading parts and the one or more second reading parts, a second carrying part configured to carry the sheet toward a direction opposite to the sheet inlet, an actuating part configured to rotate and actuate the first carrying part and the second carrying part, and a control part configured to control the first carrying part and the second carrying part, said image reading device comprising:

an adjustment control part configured to adjust the plurality of reading parts, wherein the adjustment control part is configured to calculate each displacement difference of a plurality of straight line images in a sub-scanning direction at the joints of the one or more first reading parts and the one or more second reading parts by reading a sheet showing a plurality of reference straight lines extending along a main scanning direction by the plurality of reading parts, to obtain an average value of relative displacement amounts by calculating an arithmetic average of the displacement amounts, to determine the average value as a delay amount of the image data read by each of the one or more first reading parts, and to adjust a delay time of the one or more first reading parts for the combining part.

9. The adjustment method as claimed in claim 1, further comprising:

reading the sheet in which one of the parallel line patterns including the two parallel lines extending along the sub-scanning direction by the one or more first reading parts and the one or more second reading parts is placed at a location other than the joints of the one or more first reading parts and the one or more second reading parts, beforehand.

* * * * *